United States Patent
James et al.

(10) Patent No.: US 9,043,993 B1
(45) Date of Patent: Jun. 2, 2015

(54) ANIMAL BEHAVIOR ACQUISITION SYSTEM AND METHOD

(75) Inventors: Chad R. James, Tucson, AZ (US);
Robert A. Petersen, Tucson, AZ (US);
Steven C. Thoeny, Plymouth, MN (US)

(73) Assignee: Radio Systems Corporation, Knoxville, TN (US)

( * ) Notice: Subject to any disclaimer, the term of this patent is extended or adjusted under 35 U.S.C. 154(b) by 1158 days.

(21) Appl. No.: 11/506,613

(22) Filed: Aug. 17, 2006

Related U.S. Application Data

(60) Provisional application No. 60/714,089, filed on Sep. 1, 2005.

(51) Int. Cl.
*A01K 15/02* (2006.01)

(52) U.S. Cl.
CPC .................................. *A01K 15/021* (2013.01)

(58) Field of Classification Search
CPC .................................................... A01K 15/021
USPC .................................. 119/718, 719, 720, 721
See application file for complete search history.

(56) References Cited

U.S. PATENT DOCUMENTS

| | | |
|---|---|---|
| 1,655,311 A | 1/1928 | Crow |
| 2,800,104 A | 7/1957 | Cameron |
| 2,981,465 A | 4/1961 | Bartel |
| 3,362,711 A | 1/1968 | Larsen |
| 3,589,337 A | 6/1971 | Doss |
| 3,819,108 A | 6/1974 | Jordan |
| 3,998,459 A | 12/1976 | Henderson |
| 4,202,293 A | 5/1980 | Gonda |
| 4,335,682 A * | 6/1982 | Gonda et al. ................... 119/719 |
| 4,394,956 A | 7/1983 | Andrews |
| 4,424,932 A | 1/1984 | Allen |
| 4,640,295 A | 2/1987 | Isaacson |
| 4,794,402 A | 12/1988 | Gonda |
| 4,802,482 A | 2/1989 | Gonda |
| 4,887,549 A | 12/1989 | Powell |
| 4,945,860 A | 8/1990 | Walker |
| 4,947,795 A | 8/1990 | Farkas |
| 5,054,428 A * | 10/1991 | Farkas .......................... 119/720 |

(Continued)

OTHER PUBLICATIONS

Braslau-Schneck, Stacy, "An animal trainer's Introduction to operant and classical conditioning", Nov. 12, 2003, www.wagntrain.com.*

(Continued)

*Primary Examiner* — Brian M O'Hara
(74) *Attorney, Agent, or Firm* — Pitts & Lake, P.C.

(57) ABSTRACT

A system and method used in the training of animals includes applying signals in two parts to the animal. The first part is a first conditioned stimulus cue signal having a first duration. The commencement of this signal is followed by the commencement of an unconditioned stimulus signal of a second duration. The commencement of the unconditioned stimulus signal may be either before the end of the first conditioned stimulus cue signal, simultaneous with the end of the first conditioned stimulus cue signal, or after a time interval of no signals between the end of the first conditioned stimulus cue signal and the commencement of the unconditioned stimulus signal. The signals may be electrical stimulation, vibration, sound, light, or odor. The first conditioned stimulus cue signal is used to catch the animal's attention; and the unconditioned stimulus signal is selected to be behaviorally significant to the animal for use in training of the animal.

13 Claims, 5 Drawing Sheets

(56) References Cited

U.S. PATENT DOCUMENTS

| | | | |
|---|---|---|---|
| 5,099,797 A | | 3/1992 | Gonda |
| 5,193,484 A | | 3/1993 | Gonda |
| 5,896,830 A | | 4/1999 | Stampe |
| 5,913,284 A | * | 6/1999 | Van Curen et al. ............ 119/720 |
| 6,079,367 A | * | 6/2000 | Stapelfeld et al. ............ 119/720 |
| 6,131,535 A | | 10/2000 | So |
| 6,263,836 B1 | * | 7/2001 | Hollis ............................ 119/712 |
| 6,460,489 B1 | | 10/2002 | O'Byrne |
| 6,748,902 B1 | | 6/2004 | Boesch |
| 6,860,240 B2 | * | 3/2005 | Kim et al. ..................... 119/719 |
| 7,174,855 B2 | * | 2/2007 | Gerig et al. ................... 119/718 |
| RE39,931 E | | 12/2007 | So |
| 7,409,924 B2 | * | 8/2008 | Kates ............................ 119/720 |
| 2004/0168646 A1 | * | 9/2004 | Maier, Jr. .................... 119/14.18 |
| 2005/0263099 A1 | * | 12/2005 | Gerig et al. ................... 119/719 |
| 2006/0011144 A1 | * | 1/2006 | Kates ............................ 119/719 |

OTHER PUBLICATIONS

Learning/Conditioning, www.alleydog.com/101notes/conditioning.html, Mar. 2000.*

* cited by examiner

ANIMAL BEHAVIOR ACQUISITION SYSTEM AND METHOD

RELATED APPLICATION

This patent application is based on, and claims the benefit of priority under Title 35 U.S.C. §119(e) of provisional application Ser. No. 60/714,089 filed Sep. 1, 2005, incorporated herein by reference.

BACKGROUND

Electronic training aids (frequently referred to as "shock collars") have been in use since the late 1960's to assist trainers in controlling the activities of the dogs they train. These early electronic training aids punished dogs for misbehaving when, in some cases, the dogs were responding correctly to the commands given, at least the response was correct from the perspective of the dog.

Gradually, the use of electronic training aids, in the form of "shock collars", became unacceptable; although these devices were capable of stopping certain misbehaviors. Shock collars could not subtly assist dogs in acquiring consistent new skills, and as a consequence, were not beneficial for the well being of the dogs. The results were visually unappealing to most owner/trainers, and especially were not tolerated by many onlookers.

In order to answer customer's concerns and to avoid negative press, in the late 1970's manufacturers began offering alternative methods, either by controlling the magnitude of the electrical "shock" output by means of short bursts of energy which were called "momentary" stimulation, or manufacturers began incorporating audio/ultrasonic sounds produced by a speaker or mechanical buzzers. By the early 1980's, some manufacturers began offering the capability for the owner/trainer to manually pre-set the output "intensity" levels of each dog's collar stimulator. This culminated into the "intensity outputs" becoming more of an electrical stimulation style (much like the human TENS devices), where the intensity levels could be adjusted from an almost indiscernible level upwards to an original higher setting.

After the advancement of different intensity levels, owner/trainers quickly saw the advantage of using lower levels of electrical stimulation to encourage new behaviors, as now the dogs were not "shocked" into submission. The next request from owner/trainers was to have the ability to remotely activate different intensities from their own hand-held transmitters, rather than predicting and pre-setting the levels at the dog's collar. Here, having the correct level and executing it instantly allowed for an improved "fit" for both the handler and the dog, without the previous side effects.

In addition to the advancements in electrical stimulation, audible sounds continue to be employed along with motor-driven vibrators (much like the ones found in cell phones and pagers). Although this style of cue has been offered as an alternative to electrical stimulation (a less aversive motivator), such alternative cue stimulators have been produced at only one pre-set output level. Generally speaking, most dogs initially respond; but soon the "noise" becomes a neutral stimulus, and then it is quickly lost in the dog's own background noise. This remains, unless the now perceived neutral cue is reinforced by a higher order stimulus, wherein the higher order stimuli on these devices is either a "momentary" or "continuous" style of electrical stimulation. In the past, however, all three of these different cue agents have been activated independently, on individual and separate control buttons at the transmitting device held by the owner/trainer.

Although the foregoing limited advancements helped raise the performance level of dogs during training sessions, the devices still were activated through the mind's-eye (emotional state) of the owner/trainer. Thus, the timing over the application of any one of these cueing devices was suspect and based upon the comprehension level of the dog and the discrimination capability of the dog.

From the scientific literature, those in the field of animal behavior are aware of the basic principles of Classical and Instrumental conditioning. In Classical conditioning, an outside stimulus predicts an outcome; wherein with Instrumental conditioning, the response of the animal predicts an outcome. These two powerful conditioning theories work together simultaneously (alternating) on a minute-to-minute, event-to-event, basis, and are predicted on wherever the learning acquisition of the animal is for each task.

Also, from available scientific literature, it is known that fundamental animal learning processes utilize expectation, prediction, and anticipation; where the animal comes to anticipate a future event based upon "information" or stimuli that it receives from its environment. The animal then uses these signals to translate them into anticipated behavioral changes. The animal must be able to anticipate patterns in its stimuli input in order to resolve matters of sequencing (chaining) and to anticipate various relationships. In short, the fundamental task for any animal is to be able to predict changes and to anticipate its future. Learning is the acquisition of expectancies based upon patterns of stimulus inputs and response feedback, which allow an animal to behave in an adaptive fashion.

With most competitive dogs of all breeds and disciplines now being conditioned with the use of one of a variety of these different electronic training devices, a point has been reached where an improved training tool is needed to further enhance the capability of a dog to acquire its own "belief" that new behaviors or responses are what lead to positive outcomes. Consequently, it is desirable to provide an electronic system which can mimic other known animal behavioral modification principles to allow the animal undergoing training to focus on its own performance as a result of compliance with the owner/trainer's desire.

DETAILED DESCRIPTION

Figure 1:
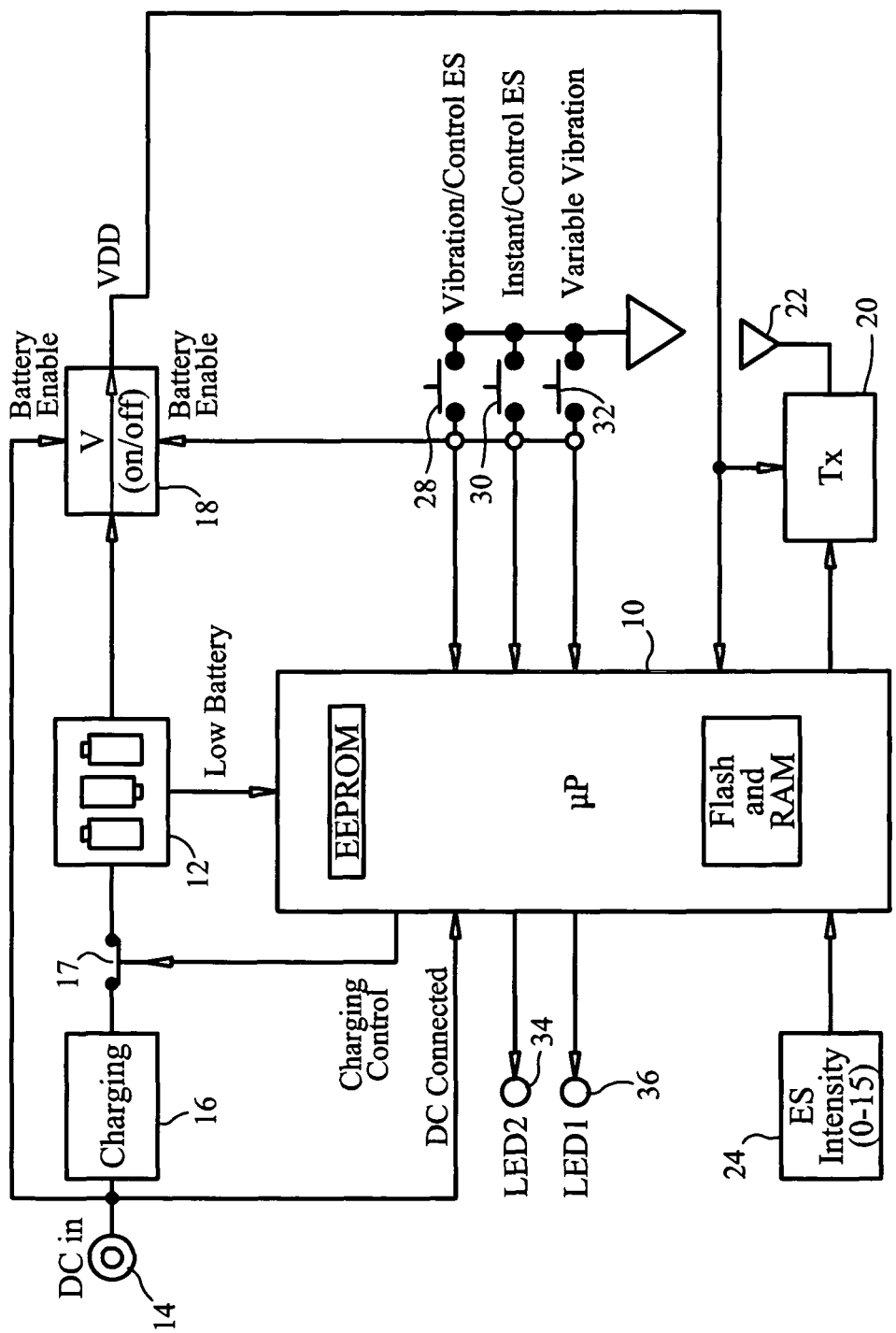
FIG. 1 is a block diagram of a transmitting unit used in conjunction with an embodiment of the invention.

Before entering into a specific discussion of the systems shown and described in the various figures of the drawing, a brief description of the concepts underlying the operation of the disclosed embodiments is considered to be in order. The approach which has been undertaken in the operation of the embodiments disclosed in the drawings is that the evolution of electronic animal training has reached a point where a "real" training tool was needed to enhance the capability of a dog (or other animal) to acquire its own "belief" that new behaviors or responses are what lead to positive outcomes.

The solution has been the development of a system which can mimic other known (more powerful) animal behavior modification principles to allow the animal undergoing training to focus on its own performance as the result of compliance to the owner/trainer's desire. The system and the method disclosed through the use of the system employs different meaningful low level cues, which the animal undergoing training can more easily discriminate. This leads to the encouragement, motivation and reinforcement of new "behaviors without causing an aversive, painful experience for the" animal. Consequently, the expectation of the animal is that its own decision processes allow it to move into an alternate behavior, instantly providing the animal with its own internal reward, since, the animal undergoing training now believes that it is the one in control. This is accomplished through technology incorporating a microprocessor which is pre-programmed to parallel or superimpose onto the cognitive behavior sequences (chaining) which an animal normally uses daily in its environment to learn what is safe and what is not.

As noted above in the discussion of the prior art, it has been demonstrated that the use of electronic training agents is behaviorally powerful, and that these agents can energize an animal's response. It has been discovered that whether the cueing agent is of a short, pre-measured burst of energy or of a continuous stream of energy, if an animal can discriminate between different cueing levels during each learning session, and if these perceived levels are below the pain threshold of the animal, the learning acquisition is amplified. It further has been found that by connecting the same "modality" of stimuli (or even two separate styles of modality) together, a manifold improvement in the response of the animal is observed. This appears as a "transitional" moment when the interacting sequences become perceived by the animal as "one event".

In the system which has been developed and which is described in conjunction with the various figures of the drawing, a variety of different cueing arrangements are presented to the animal for controlled periods of time. This is done at a variety of different perceived levels created by the use of "pulse width manipulation" electronically varying the driver "time" to a variety of output devices rather than by controlling the voltage levels of each individual device.

The device outputs are the same as are typically worn on the collar of the animal undergoing training, as in the past. The cueing agents, however, are presented in different arrangements, typically using a first brief short period of a predetermined onset and offset time (from 3 microseconds to 1000 milliseconds) as an initial component. A second component includes a controlled period of time beginning at an onset followed by an offset which ends a trainer-selected time duration of a few seconds, not exceeding a system preset maximum (which typically may be on the order of 12 seconds or so). These two signal components then are presented to the animal in one of the three following arrangements:

A. A configuration wherein the first brief period is followed by a period of delay time (no stimuli presented), and then followed by the onset of the second controlled time period up to its maximum offset or termination point.

B. A configuration wherein the first brief period offset is immediately followed by the onset of the second controlled time period for up to its maximum amount.

C. A configuration where the first brief period onset begins followed by onset of the second controlled time prior to the offset time or termination of the first brief period, and in which the second controlled time then continues until its preset or maximum offset control point.

The above configurations are incorporated into a new Animal Behavior Acquisition system and method (ABA) where the utilization of different ones of these electronic cueing agents, in different styles and output levels, are presented to an animal undergoing training. The owner/trainer then observes the "learned transitional moment" for each animal when the cueing agents transfer their power to the owner/trainer's own voice command. The ABA system is engineered directly for the benefit of the animal undergoing training, and the understanding of that animal, whether the system is manually activated from a remote control transmitter, or is automatically activated by one of several different sensory detectors (of any of a number of well known types) for a wide variety of specific learning venues. The cueing agents are patterned after animal behavior learning terms, namely Conditioned Stimulus (CS) and Unconditioned Stimulus (US).

The ABA system described in conjunction with the various figures of the drawing utilizes a first "innocuous" cue of short duration (CS), which is electronically paired with a different cue (US) of a slightly higher motivational strength or duration in time from the CS cue. This provides a routine which, from the dog's point of view, transitions and becomes "one event". With the pairing of the US over time, the animal acquires a sense of prediction expectancy that when the CS cue is generated, the CS cue by itself may elicit the animal's response. When this level of expectancy is reached by an animal, the CS cue alone is all that is needed by the owner/trainer to obtain the desired response. This causes the CS cue to be very powerful in the training/learning process. It is this acquisition or transition that leads the animal into changing a first Classical conditioned event into an Instrumental conditioned event, thereby providing the animal with its own reward.

The levels of both stimuli (CS and US) can be adjusted during the activity of the animal undergoing training, and matched to the animal's own distraction levels (whether the distraction is from background noise, or is from the animal's own adrenaline releases). This selection, made by the owner/trainer, is the criterion which dictates the level of intensity for each event. The intensity levels should elicit the same style of response by the animal as when the animal is in a relaxed state or frame of mind. In summary, the ABA system output levels are chosen to be such that the animal undergoing training easily can discriminate between cueing agents, instantly confirming to it that it is performing a correct behavior, and that the completion of the task is what creates the offset (termination) of the event. This itself becomes the animal's signal of satisfaction.

The ABA system utilizes various electronic stimuli to arrange and mimic behavior patterns such that the animal is allowed to acquire new skills. These various stimuli include the following:

A. Sound—audible, ultrasonic, subsonic and microwave created by a mechanical speaker/microphone, relay buzzer, solid state Piezoelectric, ceramic, transducers, ferrite, magnetic, card type, notebook type, and condenser (utilizing all frequencies, pulse rates, duty cycles, pulse widths, amplitudes, durations, repetition rates and the like).

B. Light—all spectrum colors, brilliances (all frequencies, pulse rates, duty cycles, pulse widths, amplitudes, durations, repetition rates, and the like).

C. Taste—sweet to poison.

D. Smell—pungent to flowery.

E. Electrical stimulation—low current (5 Microamp to 100 Milliamp), high voltage (100 VAC to 10,000 VAC) utilizing all frequencies, pulse rates, duty cycles, pulse widths, amplitudes, durations, repetition rates and the like.

F. Vibration—motor-driven, mechanical offset fulcrum, pancake, ceramic, and transducer (utilizing all frequencies, pulse rates, duty cycles, pulse widths, amplitudes, durations, repetition rates and the like).

All of the different stimuli schedules noted above are outputted from a conventional device on the animal's collar by one of three sources:

A. Manual activation of a remote, hand-held transmitter by the pressing of a button.

B. Automatic activation of a remote controlled transmitter using a sensor detector (created by optical, photo, infrared, air flow, vibration, tilt, pressure, reflective, magnetic, temperature, voltage, and current transducers/sensors of various types).

C. Activated by an on-board receiver sensory style activator (created by optical, photo, infrared, air flow, vibration, tilt, pressure, reflective, magnetic, temperature, voltage, and current transducers/sensors of various types).

Reference now should be made to the drawings, in which the same reference numbers are used throughout the different figures to designate the same or similar components. FIG. 1 is a diagrammatic block diagram of a transmitter system of the type which is employed in a hand-held battery operated unit by the owner/trainer for use in implementing the CS/US system and method described above. Basically, the transmitter of FIG. 1 is of a type generally used in conjunction with animal training devices employing a radio frequency transmitter to communicate with a receiver worn on the collar of a dog or other animal to receive electronic signals under the control of operation of switches at the owner/trainer's transmitter device. The components of such a system, which are well known in the art, are not disclosed in FIG. 1, but are only indicated in a diagrammatic fashion.

The system of FIG. 1 includes a microprocessor 10 in the form of an EEPROM device having flash and RAM memories in it. Such devices are well known; and the device of FIG. 1 is programmed with software to include a pre-established series of stimulation combinations and levels, as described in greater detail subsequently. These various levels are selected by the owner/trainer through the operation of a rotatable switch or the like in a unit 24 to determine the signal intensity, indicated in FIG. 1 as including fifteen levels, 0 to 15. Thus, the owner/trainer can select, at any given time, in advance, the particular intensity level desired for the specific animal undergoing training.

The microprocessor 10 is operated by a battery 12 which is a rechargeable battery shown as being recharged from a suitable source 14 through a charging control circuit 16 and a switch 17. The recharging of the battery 12 is effected in a conventional manner for recharging such batteries as. A low battery signal is sensed by the microprocessor 10 to provide an indication, such as through an LED 34, that the battery needs recharging. When an external source of charging voltage is supplied to the terminal 14, the battery 12 continues to be charged until it is fully charged, whereupon the switch 17 automatically is opened by the control circuitry in the microprocessor 10 in a conventional manner. At this time, the LED 34 indicates the charging status as being charged; and the source of charging voltage at 14 may be removed.

The device of FIG. 1 typically is a hand-held portable device, and is not operated until one or more of a set of switches 28,30 and 32 are closed by the operator. When any one of these switches is closed, the connection to ground for a battery enable switch 18 is made; and the battery 12 then supplies operating voltage DD through a switch 18 to the microprocessor 10 and a transmitter 20 in a conventional manner.

The system shown in FIG. 1 is described in conjunction with operation with two different types of stimulation signals for reception by a device worn on the collar of a dog, or worn by another animal undergoing training. The signals which are indicated in FIG. 1 are electrical stimulation signals (ES) and vibration signals (VB) in various modes.

Whichever ones of the switches 28,30 and 32 are selected by the trainer, the microprocessor 10 supplies a corresponding signal to the transmitter 20. The signal pattern is transmitted over an antenna 22 to a receiver worn on the collar or in some other location by the animal undergoing training. It should be noted at this time, however, that the first cueing signal (the CS signal) and the onset of the second signal portion (the US portion), automatically takes place in the selected sequence in accordance with the programming of the microprocessor 10.

Figure 2:
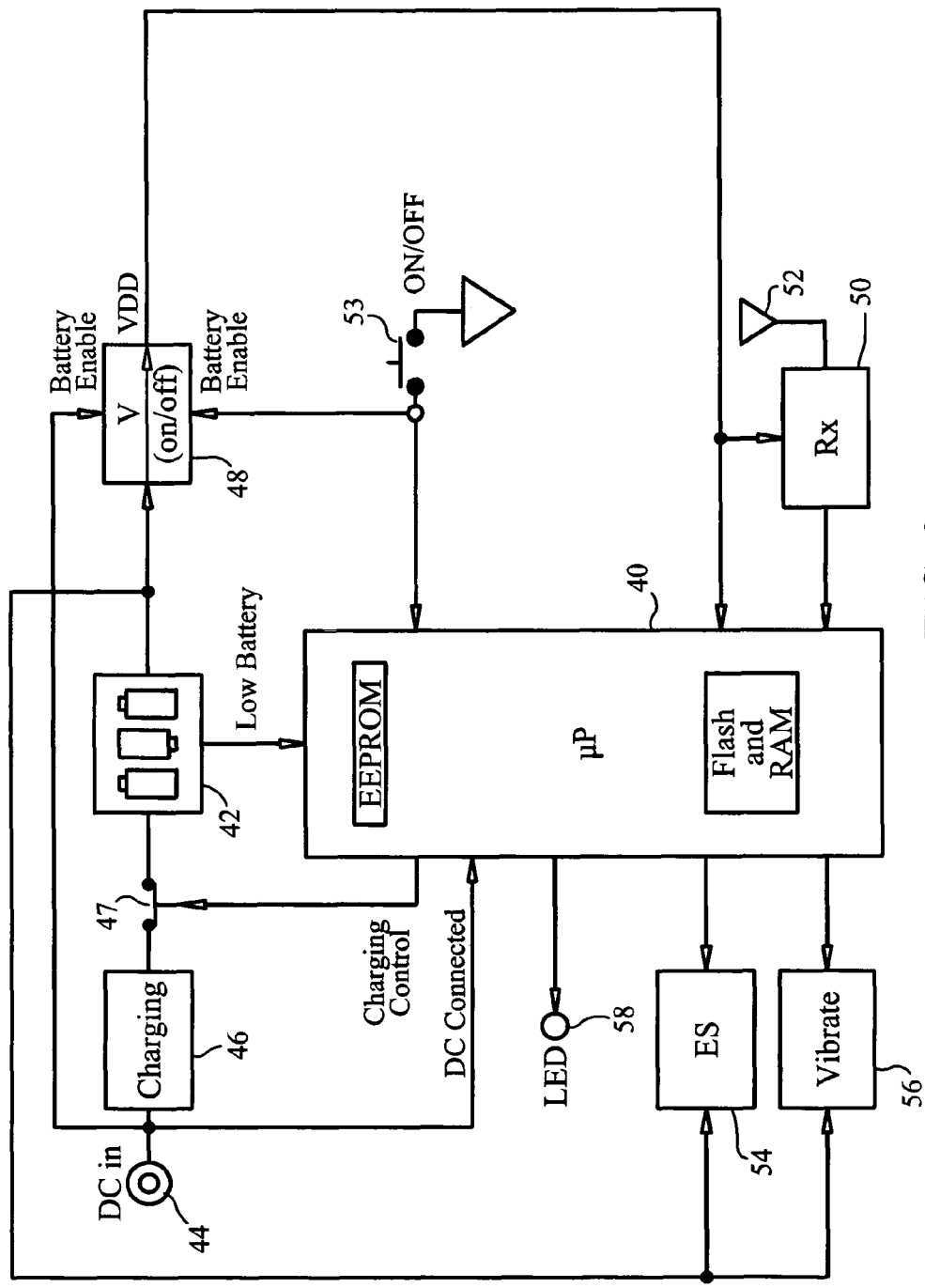
FIG. 2 is a block diagram of a receiving unit used in conjunction with an embodiment of the invention.

FIG. 2 is a block diagram of a receiver unit of the type worn on the collar of a dog undergoing training. The block diagram of FIG. 2 is similar to that of FIG. 1; and those components of a typical dog training receiving unit, which are well known, are not shown in detail in FIG. 2. As with the system of FIG. 1, the system of FIG. 2 includes a microprocessor 40 which responds to the signals from the transmitter unit of FIG. 1 to supply the selected electronic stimulation (ES) or vibration (VB) selected by the operation of the various ones of the switches 28,30,32 by the owner/trainer operating the transmitting unit of FIG. 1.

As with the unit of FIG. 1, the unit of FIG. 2 is operated by a battery 42 which supplies a signal to a microprocessor 40 to indicate a low battery condition. This condition (as well as the on/off condition of the microprocessor 40) may be indicated by an LED 58. A DC charging input terminal 44 is shown to supply DC charging voltage, through a charging circuit 46 and a switch 47, to the battery 42. Once a proper charge has been attained by the battery 42, the switch 47 is opened in accordance with known practice; and the source of charging voltage at 44 may be removed.

When the system of FIG. 2 is to be activated, a switch 53 is closed to enable the battery 42, through a battery enable switch 48, to supply VDD operating voltage to the microprocessor 40 and to a receiver unit 50 of a conventional type. The receiver unit 50 then receives signals over an antenna 52 from the transmitter antenna 22 to operate the system. Depending upon the mode which has been selected at the transmitter and/or the receiver through the microprocessor 40, signals are supplied to an electronic stimulator driver 54 and/or a vibrator driver 56 worn on the collar of the animal. The electronic stimulation may take place through any of a variety of known applicators, including a pair of spaced electrodes which make physical contact with the skin on the neck of the animal. The vibration obviously can take place through a small motor located in the collar receiving unit to shake the unit and thus the collar, in accordance with the vibration signals.

Figure 3:
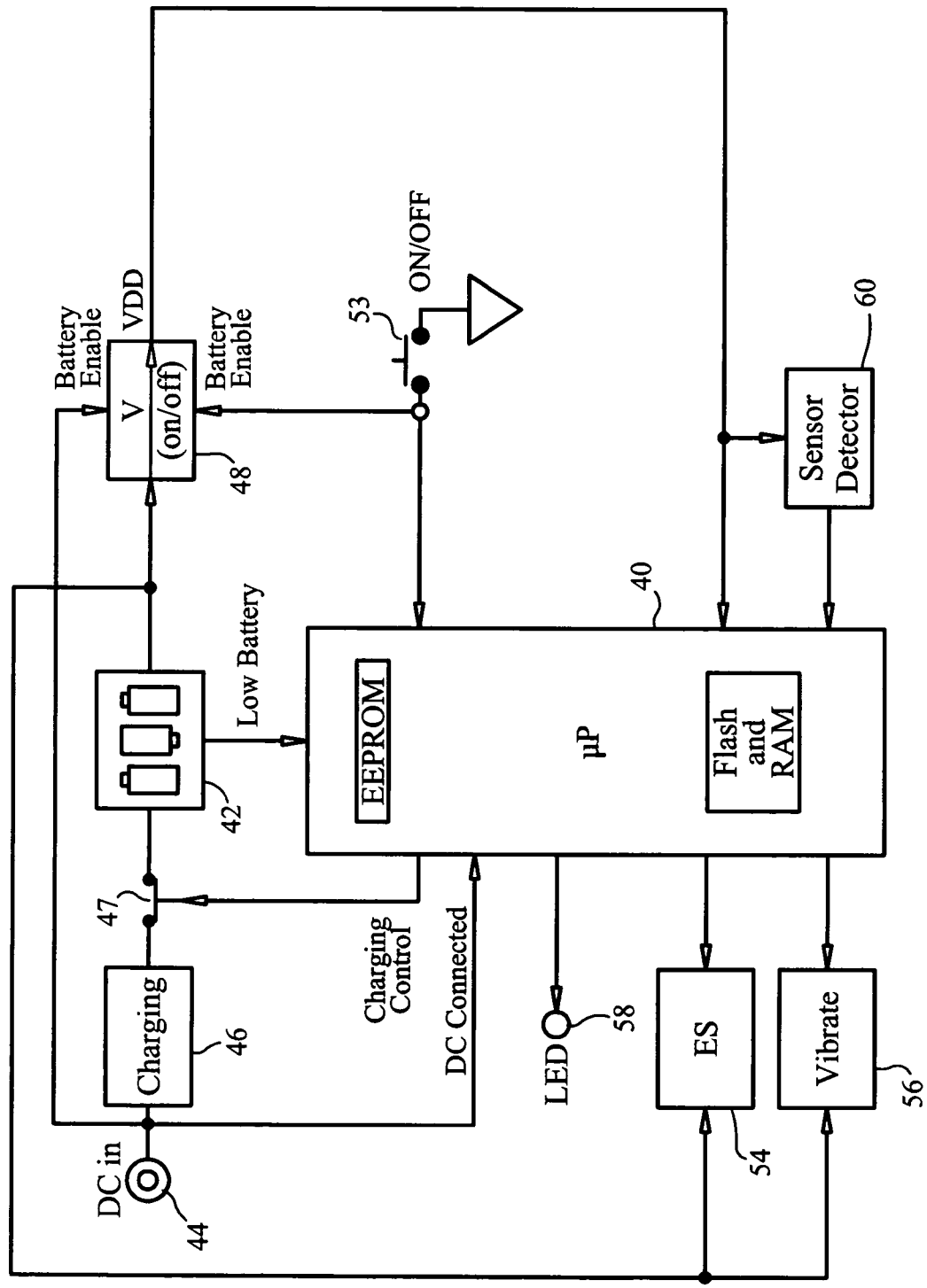
FIG. 3 is an alternative of the embodiment shown in FIG. 2.

FIG. 3 is identical to the circuit of FIG. 2, with the exception that the receiver 50 and antenna 52 have been replaced with a sensor detector 60. In all other respects, the circuit of FIG. 3 is the same as that of FIG. 2 and operates in the same manner as the circuit of FIG. 2. Instead of receiving signals from a remote transmitter, such as the transmitter shown in FIG. 1, however, the system of FIG. 3 is triggered by the sensing of a pre-established condition by the sensor detector 60 to initiate pre-set stimulation sequences (programmed in the microprocessor 40) for operating an electronic stimulation device 54 and/or a vibration device 56, as described above in conjunction with FIG. 2. A typical type of sensing detection to trigger the sensor detector 60 may be a magnetic boundary around the perimeter of property, with a magnetic detector in the sensor 60 to trigger the sensor 60 for operation of the microprocessor 40 whenever the animal wearing the system of FIG. 3 nears or crosses that boundary. The sensor detector 60 could be a vibration detector initiated by the barking of a dog, for example, or any of a variety of fixed stimulus devices or conditions of known types.

Figure 7:
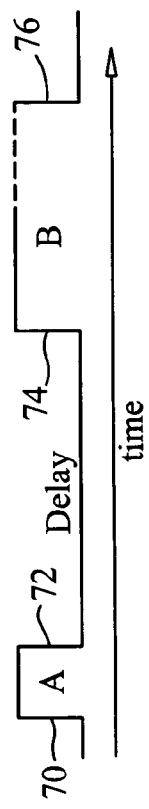
FIGS. 7, 8 and 9 are diagrammatic time charts of signal patterns used in conjunction with various embodiments of the invention.

As generally described above, the ABA system and method develops a matrix of different electronic output schedules from an apparatus (animal-worn housing) which superimposes different cueing agents (discriminated and learned by the animal as "one event"). This is done with a matrix pattern to represent behavior modification techniques which animals utilize daily. The ABA system accomplishes the task by utilizing any one of three separate CS/US timed events as diagrammatically depicted in FIGS. 7,8 and 9. The first of these events is depicted in FIG. 7, which shows the CS event identified as Event A in FIG. 7, with an onset at 70 and offset or termination at 72. This first cueing event then is separated by a time delay (which may be variable), followed by the onset 74 of the second US Event B, which is offset or terminated at 76. Typically, at the moment of activation 70, the first CS event is created by a pre-set short duration onset/offset of from 3 Microseconds to 1000 Milliseconds, followed by a period (the delay period) of no cueing agent at from typically 3 Microseconds to 1000 Milliseconds. This delay of no cueing agent then is followed by the onset 74 of the second cueing agent (US), which remains on until the owner/trainer releases the button (28,30,32 of FIG. 1) on the hand-held transmitter, or whenever the automatic time-out shut-down in the receiver microprocessor 40 takes place. If the preset timer is activated (after approximately twelve seconds), the receiver is shut down and cannot be reactivated until the shut down period has elapsed from a pre-established time typically of from 30 seconds to 90 seconds. Thus, even if the owner/trainer operating the transmitter unit of FIG. 1 fails to release the selected push button 28,30,32 prior to the preset time-out, the time-out terminating the US period at 76 is automatically effected by the receiving unit 40.

Figure 8:
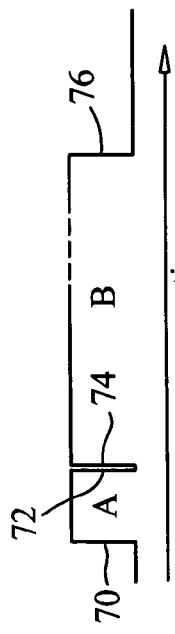

A second CS/US timed event is diagrammatically depicted in FIG. 8. This event is commenced at the moment of activation by the beginning of the first cueing CS at 70, which is created by a preset short duration onset/offset of from approximately 3 microseconds to 1000 milliseconds, whereupon the CS cue terminates at 72. The onset of the second cueing agent US at 74, however, immediately commences at the offset 72 of the first cueing agent, with no time delay between the two; and the second cueing agent US (shown as B in FIG. 8) continues until the owner/trainer releases the button 28,30,32 on the hand-held transmitter. As described above in conjunction with the first manner of operation shown in FIG. 7, an internal shut-down safety preset timer causes the termination of the US signal at 76 according to the safety preset, irrespective of the operation of the sensor detector 60 or the push button 28,30,32 of a transmitter unit.

Figure 9:
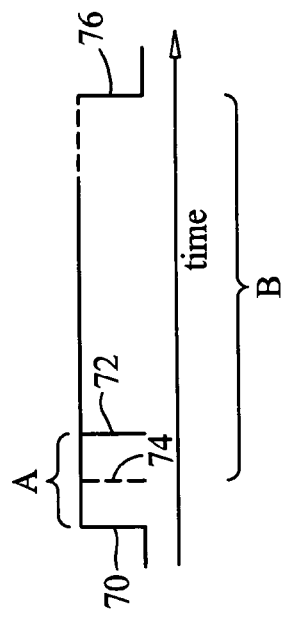

The third manner of operation of the system is shown in FIG. 9. At the moment of activation in this mode of operation, the first cueing signal (CS) again is initiated at an onset 70. The duration of this signal again is a preset signal of some 3 microseconds to 1000 milliseconds; and it terminates at 72, as shown in FIG. 9. At a preset moment before the offset 72 of the first cueing agent CS in the operation shown in FIG. 9, however, the onset 74 of the second cueing agent US (shown as B in FIG. 9) occurs; and it again remains on until the owner/trainer releases the button on the hand-held transmitter. Again, the only other shut-down is the internal safety preset timer in the receiver 50, which shuts down the receiver and does not reactivate until the shut-down period of from 30 seconds to 90 seconds typically has elapsed.

All of the different cueing agents contained in the matrix program described above in conjunction with FIGS. 7,8 and 9 follow the above process. Each one of the many varieties of cueing agents contained in the matrix typically has three to fifteen different preset levels of stimulation. These levels are pre-programmed to offer the behavior sequencing needed for the animal to sense, discriminate and understand the two cueing agents (CS and US) in order to make cognitive decisions (predictions) based on the sensation by each stimuli level.

The CS always occurs first; and US begins and finishes second. In this manner, the US provides reinforcement of the CS cueing signal, creating an unconditioned response (UR) from the animal as acquisition time improves. As learning progresses, the CS can take on the same association as the US, with the animal responding before the onset of the US signal, creating a conditioned response (CR). The animal at this level now is much more "alert" knowing that its quick response allows itself its own reward by beating the slightly more motivational US signal. As described above, when an owner/trainer detects the desired behavior in the animal, the push button 28,30,32 immediately may be released, thereby terminating or even eliminating the need for the US signal. It may be advantageous to cause the termination of the US signal to be a rapidly but linear declining of intensity, rather than a sudden cut off.

The first cueing signal, the CS signal, should be of a lower intensity or of a lower perceived level than the second or US signal. For example, if electronic stimulation is used for both CS and US, the CS signal should be of a lower perceived intensity and duration than that of the US signal. If a combination of signals is used, for example a combination of electrical stimulation (ES) and vibratory signals (VB), the CS signal should be the vibratory (VB) signal, followed by electrical stimulation, and not vice-versa. Similarly, light or odor stimulation typically would be used as a CS stimulation, followed by either electrical stimulation (ES) or vibratory (VB) US signal portion.

Figure 4:
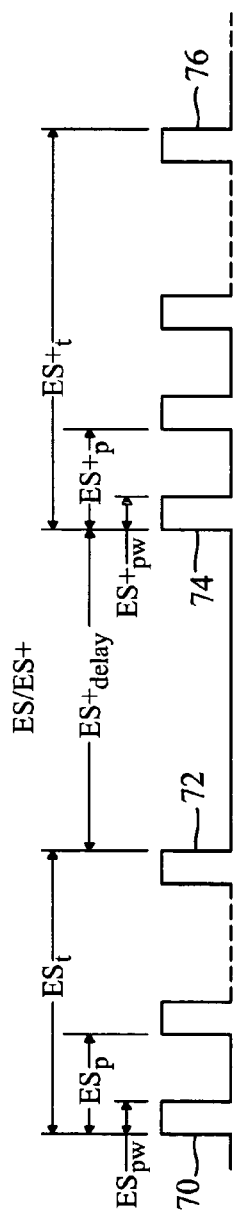
FIG. 4 is a diagram of a signal pattern in accordance with an embodiment of the invention.

Reference now should be made to FIG. 4 in conjunction with a signal pattern of the type shown in FIG. 7, with a pre-established delay between the offset 72 of the CS cue and the onset 74 of the US cue. In FIG. 4, the CS and US cues are both indicated as being electrical stimulation (ES). The CS cue is shown in FIG. 4 as the electrical stimulation ES; and the US cue is shown as the electrical stimulation ES+. In the example shown in FIG. 4, assume that the CS signal, commencing at 70 and offsetting at 72, is a preset 3 milliseconds followed by a 50 millisecond delay (shown as ES+delay) of no cueing agent. The onset of the US cueing agent at 74 and its offset at 76 at approximately one second later follow the delay. Assume that the sensation level chosen is level 1, but that there are fourteen additional but higher orders of intensity levels available. There must be some means for the other fourteen levels to effectively change and be distinguishable from one another. Therefore, the duty cycle, frequency, pulse width and repetition rate of the CS signal (70/72) is changed for each level and the perceived electrical stimulation level for each CS position is changed.

Next, the US cue (74/76) must be predictable, recognizable and discriminated by the animal as being of a more or higher motivational level than the preset CS during this same one event (selected by the owner/trainer in this example at level 1). Consequently, the components, frequency, duty cycle, pulse width and repetition rate of the US also change for each level, and the perceived level for each US position is changed. In addition, the delay time between the CS and US at each preset level may change (but not necessarily). The delay must not interfere with the animal's capability to cognitively sense the difference between the two individual stimuli. The preset stimulus matrix for each level, is set with the following parameter, namely the total relationship of the two cues (CS and US) must be felt by the animal, allowing them to be predictable, to be separately discriminated, and to set up an expectation by the animal regardless of background noise, current adrenaline releases, and distraction levels. Table number below provides a typical representation of the electrical stimulation ES (CS cue) and electrical stimulation ES+ (US cue) as used in conjunction with the time delay mode described above in conjunction with FIGS. 4 and 7.

Figure 5:
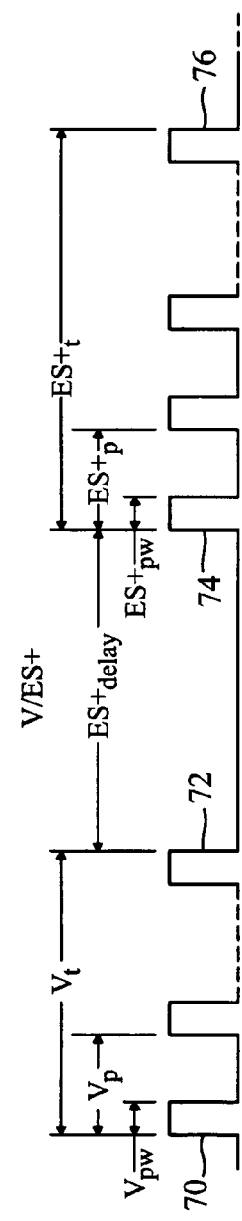
FIG. 5 is a diagram of a signal pattern of an embodiment of the invention.

Basically, the system of FIG. 5 and indicated above in Table 2 operates in a manner quite similar to the one described above in conjunction with FIGS. 4 and 7. A vibration level, however, is selected as the cueing signal at an onset at 70 and an offset at 72. Otherwise, the system operation is in accordance with the principles described above and described in conjunction with the system of FIG. 4.

TABLE 1

| | STIMULATION (ES)/STIMULATION PLUS (ES+), w/ES freq = 285 hz | | | | actual | actual |
|---|---|---|---|---|---|---|
| LEVEL | ES time = ms | ES pw = us | Delay time = ms | ES+ pw = us | DIT – ES = v | DAH – ES = v |
| 1 | 100 | 3 | 500 | 5 | 125 | 140 |
| 2 | 150 | 3 | 500 | 5 | 135 | 150 |
| 3 | 195 | 4 | 500 | 5 | 145 | 150 |
| 4 | 75 | 5 | 500 | 7 | 175 | 215 |
| 5 | 75 | 8 | 500 | 10 | 200 | 250 |
| 6 | 65 | 12 | 500 | 15 | 225 | 250 |
| 7 | 65 | 20 | 500 | 25 | 325 | 350 |
| 8 | 65 | 65 | 500 | 75 | 750 | 800 |
| 9 | 65 | 95 | 500 | 105 | 1000 | 1100 |
| 10 | 65 | 146 | 500 | 150 | 1500 | 1600 |
| 11 | 65 | 205 | 550 | 210 | 2100 | 2200 |
| 12 | 65 | 285 | 575 | 295 | 3000 | 3100 |
| 13 | 65 | 345 | 600 | 355 | 3600 | 3800 |
| 14 | 65 | 545 | 625 | 555 | 4500 | 4750 |
| 15 | 65 | 990 | 650 | 1000 | 5000 | 5000 |
| | OUTPUT FROM STIMULATOR DRIVE CIRCUIT | | | | OUTPUT FROM ELECTRODES USING HI-VOLTAGE PROBE | |

As can be ascertained from a reference to Table 1 above, the lowest electrical stimulation level of the fifteen is shown as Level 1, with the highest stimulation being Level 15. The variation in electrical stimulation from very low to higher is primarily effected by pulse width modulation, with the narrowest pulse widths being at the lowest stimulation level and the widest pulse widths for both the CS (ES) and US (ES+) signals being at the highest stimulation level.

Table 2 below shows the use of a CS cue as a vibratory signal coupled with a US signal in the form of electrical stimulation plus (ES+).

Figure 6:
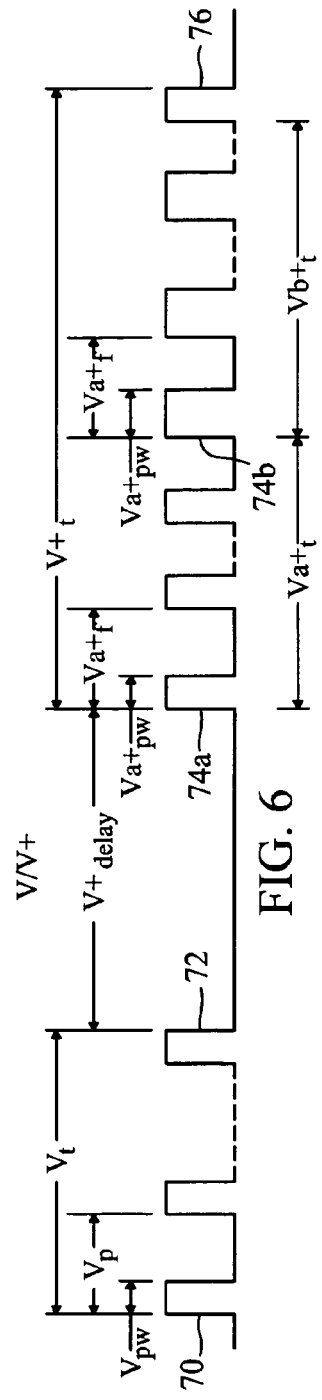
FIG. 6 is a diagram of a signal pattern in accordance with an embodiment of the invention.

FIGS. 6 and 7 should be considered together for the showing of a vibration (VB)/vibration plus (VB+) combination for the CS cueing signal and the US cueing event. In FIG. 6, however, the US event includes two different vibratory signals continuously alternating with one another, one at one frequency and one at another frequency creating different perceived intensities from the CS. This is shown in Table 3 below.

TABLE 2

| | VIBRATION (VB)/STIMULATION PLUS (ES+), w/VB freq = 525 hz | | | | actual | actual |
|---|---|---|---|---|---|---|
| LEVEL | VB time = ms | VB pw = us | Delay time = ma | ES+ pw = us | *DIT – VB = us | **DAH – ES = v |
| 1 | 500 | 750 | 500 | 5 | 1175 | 200 |
| 2 | 500 | 800 | 500 | 6 | 1125 | 225 |
| 3 | 500 | 850 | 500 | 8 | 1075 | 250 |
| 4 | 500 | 900 | 500 | 10 | 1025 | 275 |
| 5 | 500 | 950 | 500 | 15 | 975 | 275 |
| 6 | 500 | 1000 | 500 | 20 | 925 | 350 |
| 7 | 500 | 1100 | 500 | 35 | 825 | 500 |
| 8 | 500 | 1200 | 500 | 55 | 725 | 850 |
| 9 | 500 | 1300 | 500 | 75 | 625 | 800 |
| 10 | 500 | 1400 | 500 | 95 | 525 | 1000 |
| 11 | 500 | 1500 | 500 | 125 | 425 | 1250 |
| 12 | 500 | 1800 | 500 | 165 | 325 | 1700 |
| 13 | 500 | 1700 | 500 | 205 | 225 | 2250 |
| 14 | 500 | 1800 | 500 | 275 | 125 | 3000 |
| 15 | 500 | 1900 | 500 | 355 | 25 | 3900 |
| | OUTPUT FROM MOTOR & STIMULATOR DRIVE CIRCUITS | | | | *OUTPUT FROM MOTOR **OUTPUT FROM ELECTRODES | |

TABLE 3

| VIBRATION (VB)/VIBRATION PLUS (VB+), W/ROC&ROLL = VB + a freq = 475 hz & VB + b freq = 525 hz | | | | | | | | | |
|---|---|---|---|---|---|---|---|---|---|
| LEVEL | VB time = ms | VB pw = us | Delay time = ms | VB + a time = ms | VB + a pw = us | VB + b time = ms | VB + b pw = us | DIT – VB = us | DAH – VB+ = us |
| 1 | 500 | 750 | 500 | 150 | 750 | 150 | 750 | 1175 | 1375 |
| 2 | 500 | 800 | 500 | 150 | 800 | 150 | 800 | 1125 | 1325 |
| 3 | 500 | 850 | 500 | 150 | 850 | 150 | 850 | 1075 | 1275 |
| 4 | 500 | 900 | 500 | 150 | 900 | 150 | 900 | 1025 | 1225 |
| 5 | 500 | 950 | 500 | 150 | 950 | 150 | 950 | 975 | 1175 |
| 8 | 500 | 1000 | 500 | 150 | 1000 | 150 | 1000 | 925 | 1125 |
| 7 | 500 | 1100 | 500 | 150 | 1100 | 150 | 1100 | 825 | 1025 |
| 8 | 500 | 1200 | 500 | 150 | 1200 | 150 | 1200 | 725 | 925 |
| 9 | 500 | 1300 | 500 | 150 | 1300 | 150 | 1300 | 625 | 825 |
| 10 | 500 | 1400 | 500 | 150 | 1400 | 150 | 1400 | 525 | 725 |
| 11 | 500 | 1500 | 500 | 150 | 1500 | 150 | 1500 | 425 | 625 |
| 12 | 500 | 1600 | 500 | 150 | 1600 | 150 | 1600 | 325 | 525 |
| 13 | 500 | 1700 | 500 | 150 | 1700 | 150 | 1700 | 225 | 425 |
| 14 | 500 | 1800 | 500 | 150 | 1800 | 150 | 1800 | 125 | 325 |
| 15 | 500 | 1900 | 500 | 150 | 1900 | 150 | 1900 | 25 | 225 |
| OUTPUT FROM VIBRATION MOTOR DRIVE CIRCUIT | | | | OUTPUT FROM VIBRATION MOTOR DRIVE CIRCUIT | | | | OUTPUT FROM MOTOR | |

As is apparent from an examination of Table 3 above, the pulse width of the vibratory signals is the same for all three signal portions. The perceived intensity, however, varies as indicated in the chart; as the US signal portion includes a first portion VB+a at a frequency of 475 Hz and a second portion VB+b at 525 Hz, which continuously alternate with one another, but each drive signal adds throughout the length of the time period selected by the owner/trainer for the US signal portion, enhancing the perceived effect of US in relationship to the CS event.

Various other combinations of signals in accordance with the foregoing formats may be established. It also should be noted that while FIGS. 4,5 and 6 all show a delay between the offset of the CS cue portion at 72 and the onset of the US cue portion at 74, the onset/offset patterns of FIGS. 8 and 9 also may be equally as well employed with the different signal combinations of FIGS. 4,5 and 6 by eliminating the delay and by overlapping the signals, as shown in Figure's 8 and 9, respectively.

It also should be noted that the rolling vibration ("rock and roll") indicated in the US portion of the signal 74a & 74b to 76 of FIG. 6 also can be employed as varying electrical stimulation. The CS cue 70 to 72 of a vibratory signal or electrical stimulation also may be a similar short "rock and roll" pattern. The microprocessors 10 and 40 readily can be programmed to provide these different alternating frequency combinations, as well as the single frequency combinations shown in FIGS. 4 and 5.

The owner/trainer operating the transmitter unit of FIG. 1 may pre-select the level of stimulation by use of a rotating positioning switch or rheostat on the intensity unit 24, which offers the different level settings (from very low to high enough to get the attention of the animal regardless of the level of distraction the animal is under). Thus, when the trainer pushes the button 28,30,32 on the transmitter unit, or if the device is one of several automatically controlled sensor detectors, such as the detector 60 in FIG. 3, the housing unit on the animal (FIG. 2 or FIG. 3) delivers the CS/US sequence at the preset level. When the device is remotely controlled by a hand-held transmitter as shown in FIG. 1, the trainer can adjust the level via unit 24 for more or less sensation even while the button 28,30,32 is being held down, thereby matching the behavior needs of the animal instantly.

The selection of the different levels is available for whatever electronic cueing agent is being utilized. For example, if electrical stimulation (ES), vibration (VB), and sound (S) are being utilized in various combinations, the combinations can be selected by push buttons, such as 28,30 and 32 (and additional buttons, if necessary). For example, ES/ES, V/ES, S/ES, VB/S, S/VB and S/S combinations may be employed. Each of these would require a different push button on the same hand-held transmitter, or a multi-use setting on the animal housing, depending upon which sensor detector model is in use. The changing of the electrical stimulation for both CS and US is increased/decreased by changing the pulse width of the stimulator energy envelope (current) rather than by raising or lowering the traditional energy output level (voltage). The electrical stimulation output frequency is set to operate from 285 Hz to 325 Hz. Additionally, as mentioned previously, it may be desirable for the US offset 76 to taper down in amplitude in direct correspondence to the duration of pulse width. This effect is used to generate a distinctively different sensation for the animal between CS and US portions of the signal.

The style for varying the level of vibration output for both CS and US follows a routine that the animal perceives as sense of "shaking" mimicing the effect of electrical stimulation, rather than just one preset level or pulse width. This is called variable vibration, and is designed to generate a distinctively different sensation for the animal between the CS and US signal portions.

For a sound (audible) output, varying of the level of the sound follows a routine in which the animal perceives a sense of a "warbling" effect rather than just one preset frequency. This may be called variable sound; and it occurs both during the CS and US schedules. Again, this effect is designed to generate a distinctively different sensation for the animal between the CS and US signal portions.

As noted above, once the particular operation mode has been selected, the CS initial stimulation cueing is automatically followed by (or overlapped by) the US stimulation cueing. The CS portion of the signal is fixed by the system and is not controlled by the owner/trainer through the selection of any of the push button switches. The US portion, however, can be controlled (that is, its termination time determined) by release of the depressed push button on the transmitter unit by the owner/trainer. The overall effect of these different signal portions is for the CS portion to simulate a "dit" signal while the US portion (typically the longer portion) is likened unto a "dah" signal. Thus, the entire combined CS/US signal portion comprises a "dit/dah" signal, with the "dah" portion being controllable in length during a training session when a transmitter unit, such as the unit of FIG. 1, is used in conjunction with a receiver unit of the type shown in FIG. 2.

When the animal receives the various types of stimulation using this "dit-dah" signal sequence, the impression to the animal is as a "one event" happening. In this "one event" method, regardless of manual or automatic activation, the perception for the animal is always present, either Classical conditioning or Instrumental conditioning. The animal always wins. The essence of this creation is the combination (parallel) between the activation (onset and offset) of a variety of cueing agents to be in synchronization with how and what the animal needs to predict how to respond in order to acquire or learn new behaviors with ease and with a sense of calm.

Another result of this "one event" method of stimulation, which leads or transitions as a stand in for CS, is the owner/trainer verbal cues. It should be noted that when the CS/US style is used-with a delay time between the CS and US signal portions, the delay may change based upon the relationship between the cues. This is true particularly if the cues are represented by different styles, that is, audible sound (CS) followed by electrical stimulation plus (US), or audible sound (CS) followed by mechanical vibration plus (US). The delay also may vary when the level of similar or the same style of cue is used, such as vibration (CS) and vibration plus (US), or electrical stimulation (CS) followed by electrical stimulation plus (US). The delay is selected such that the animal may easily discriminate the difference (hierarchy) between each single event and for each level of CS/US regardless of the style or level used for the cue. When there is no delay or an overlap between CS and US, however, the only criterion is that the animal must be able to discriminate between the CS/US at each level.

The foregoing description of the embodiments of the invention is to be considered as illustrative and not as limiting. Various types of signal combinations in accordance with the disclosures made above, and not all of which have been described in detail, may be employed in accordance with the various principles of the invention as set forth in the described embodiments. Various other changes and modifications will occur to those skilled in the art for performing substantially the same function, in substantially the same way, to achieve substantially the same result without departing from the true scope of the invention as defined in the appended claims.

What is claimed is:

1. A method of training an animal to perform a selected behavior using non-aversive stimuli, said method comprising the steps of:
    providing an electronic animal training device adapted to be worn by an animal, the electronic animal training device capable of producing a conditioned stimulus paired with an unconditioned stimulus as one event in a predetermined sequence, said unconditioned stimulus being distinguishable from the conditioned stimulus by the animal, both said conditioned stimulus and said unconditioned stimulus being non-aversive to the animal;
    providing a sensor on said electronic animal training device capable of detecting a first predetermined behavior of the animal;
    detecting said first predetermined behavior of the animal, said first predetermined behavior being different than the selected behavior;
    providing a microcontroller to instruct the animal training device to start said predetermined sequence in response to detecting that the animal is performing the first predetermined behavior, wherein said predetermined sequence comprises:
        starting application of said conditioned stimulus, starting application of said unconditioned stimulus subsequent to the start of said conditioned stimulus if the animal has not changed behavior from the first predetermined behavior to the selected behavior, stopping application of said conditioned stimulus after a predetermined first duration, stopping application of said unconditioned stimulus immediately when the animal changes behavior from the first predetermined behavior to the selected behavior, and avoiding the application of said unconditioned stimulus if the animal has changed behavior from the first predetermined behavior to the selected behavior before the application of said unconditioned stimulus; and
    starting application of said predetermined sequence.

2. The method of claim 1 wherein starting application of said unconditioned stimulus to the animal occurs prior to stopping application of said conditioned stimulus to the animal.

3. The method of claim 1 wherein starting application of said unconditioned stimulus to the animal occurs substantially contemporaneously with stopping application of said conditioned stimulus to the animal.

4. The method of claim 1 wherein starting application of said unconditioned stimulus to the animal occurs subsequent to stopping application of said conditioned stimulus to the animal.

5. The method of claim 1 wherein starting application of said unconditioned stimulus to the animal occurs prior to said step of stopping application of said conditioned stimulus to the animal.

6. The method of claim 1 further comprising the step of stopping application of said unconditioned stimulus to the animal if the animal does not perform the selected behavior within a predetermined second duration.

7. The method of claim 6 wherein said second duration is substantially greater than said first duration.

8. The method of claim 1 wherein said unconditioned stimulus has a greater intensity than said conditioned stimulus as perceived by the animal.

9. The method of claim 8 wherein said conditioned stimulus is a non-electrical stimulation and said unconditioned stimulus is an electrical stimulation.

10. The method of claim 1 further comprising the step of selectively adjusting the intensity for the pair of said conditioned stimulus and said unconditioned stimulus.

11. The method of claim 1, wherein the starting application of said unconditioned stimulus automatically takes place subsequent to the starting application of said conditioned stimulus.

12. The method of claim 1, wherein application of the unconditioned stimulus is stopped by sudden cut-off of the unconditioned stimulus.

13. A method of training an animal to perform a selected behavior using non-aversive stimuli, said method comprising the steps of:
    providing an electronic animal training device adapted to be worn by an animal, the electronic animal training device capable of producing a conditioned stimulus paired with an unconditioned stimulus as one event in a predetermined sequence, said unconditioned stimulus being distinguishable from the conditioned stimulus by the animal, both said conditioned stimulus and said unconditioned stimulus being non-aversive to the animal;
providing a sensor on said electronic animal training device capable of detecting a first predetermined behavior of the animal;
detecting said first predetermined behavior of the animal, said first predetermined behavior being different than the selected behavior;
providing a microcontroller to instruct the animal training device to start said predetermined sequence in response to detecting that the animal is performing the first predetermined behavior, wherein said predetermined sequence comprises:
  starting application of said conditioned stimulus, starting application of said unconditioned stimulus subsequent to the start of said conditioned stimulus if the animal has not changed behavior from the first predetermined behavior to the selected behavior, stopping application of said conditioned stimulus after a predetermined first duration, stopping application of said unconditioned stimulus by immediately declining an intensity of the unconditioned stimulus over time when the animal changes behavior from the first predetermined behavior to the selected behavior, and avoiding the application of said unconditioned stimulus if the animal has changed behavior from the first predetermined behavior to the selected behavior before the application of said unconditioned stimulus; and
starting application of said predetermined sequence.

* * * * *